(12) United States Patent
Takahashi

(10) Patent No.: US 8,830,390 B2
(45) Date of Patent: Sep. 9, 2014

(54) DIGITAL CAMERA WITH STORAGE PORTION PROVIDED BENEATH ELECTRONIC AND MODE DIALS

(75) Inventor: Kazunori Takahashi, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 13/491,756

(22) Filed: Jun. 8, 2012

(65) Prior Publication Data
US 2012/0314125 A1   Dec. 13, 2012

(30) Foreign Application Priority Data
Jun. 9, 2011   (JP) ................. 2011-128986

(51) Int. Cl.
H04N 5/225 (2006.01)
G03B 17/18 (2006.01)
H04N 5/232 (2006.01)

(52) U.S. Cl.
CPC ........... *H04N 5/232* (2013.01); *H04N 5/23245* (2013.01)
USPC ............................. 348/376; 348/373; 396/281

(58) Field of Classification Search
CPC ................................................. G03B 2217/002
USPC .................... 348/373, 376; 396/281
See application file for complete search history.

(56) References Cited

U.S. PATENT DOCUMENTS

| 5,602,616 A * | 2/1997 | Sato et al. ...................... 396/238 |
| 5,732,296 A * | 3/1998 | Katano et al. ................. 396/281 |
| 5,799,218 A * | 8/1998 | Aoki .............................. 396/297 |
| 2005/0123270 A1 * | 6/2005 | Okumura ........................ 386/46 |

FOREIGN PATENT DOCUMENTS

JP   2004-274670 A   9/2004

* cited by examiner

*Primary Examiner* — Joel Fosselman
(74) *Attorney, Agent, or Firm* — Greenblum & Bernstein P.L.C.

(57) ABSTRACT

Provided is a digital camera including an electronic dial and a mode dial on an upper portion of a camera main unit, where upper surfaces of these dials approximately flush with an upper surface of the main unit, and are arranged in parallel with the optical axis of the main unit. The length from the upper end to the lower end of the mode dial is approximately the same as the length from the upper end of the electronic dial to a lower end of an encoder arranged below the electronic dial. This configuration forms a space in a box shape below these dials, and the space below the electronic dial can be efficiently used by setting the space as the storage portion for a recording medium to be inserted from the outside, resulting in downsizing the camera without sacrificing the operability.

19 Claims, 5 Drawing Sheets

DIGITAL CAMERA WITH STORAGE PORTION PROVIDED BENEATH ELECTRONIC AND MODE DIALS

BACKGROUND OF THE INVENTION

1. Field of the Invention

The present invention relates to a digital camera, more particularly to a compact digital camera.

2. Description of the Related Art

Digital cameras are being made increasingly compact. An electronic dial and a mode dial of the digital camera are usually arranged on the right side of a camera main unit as a result of the downsizing. Moreover, as these dials, there are known dials which are arranged only on an upper surface and a rear surface of the camera main unit on the right side of the camera main unit so as to protrude from the upper surface of the camera main unit, and are operated only by the thumb of the right hand (refer to Japanese unexamined Patent Publication No. 2004-274670).

However, further downsizing of the digital camera is difficult for the conventional dial arrangement, and the dials are arranged so as to protrude from the camera main unit for arranging the dials without sacrificing operability, thereby forming a useless space, resulting in difficulty in downsizing.

SUMMARY OF THE INVENTION

It is therefore an object of the present invention to downsize the digital camera without sacrificing the operability.

A digital camera according to the present invention includes an electronic dial and a mode dial on an upper portion of a camera main unit, where upper surfaces of the electronic dial and the mode dial approximately flush with an upper surface of the camera main unit, the electronic dial and the mode dial are arranged so that the mode dial on the front side of the camera main unit, and the electronic dial on the rear side of the camera main unit are in parallel with the optical axis of the camera main unit on the end portion of the camera main unit, and the length from the upper end to the lower end of the mode dial is approximately the same as the length from the upper end of the electronic dial to the lower end of an encoder arranged below the electronic dial.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENT

Figure 5:
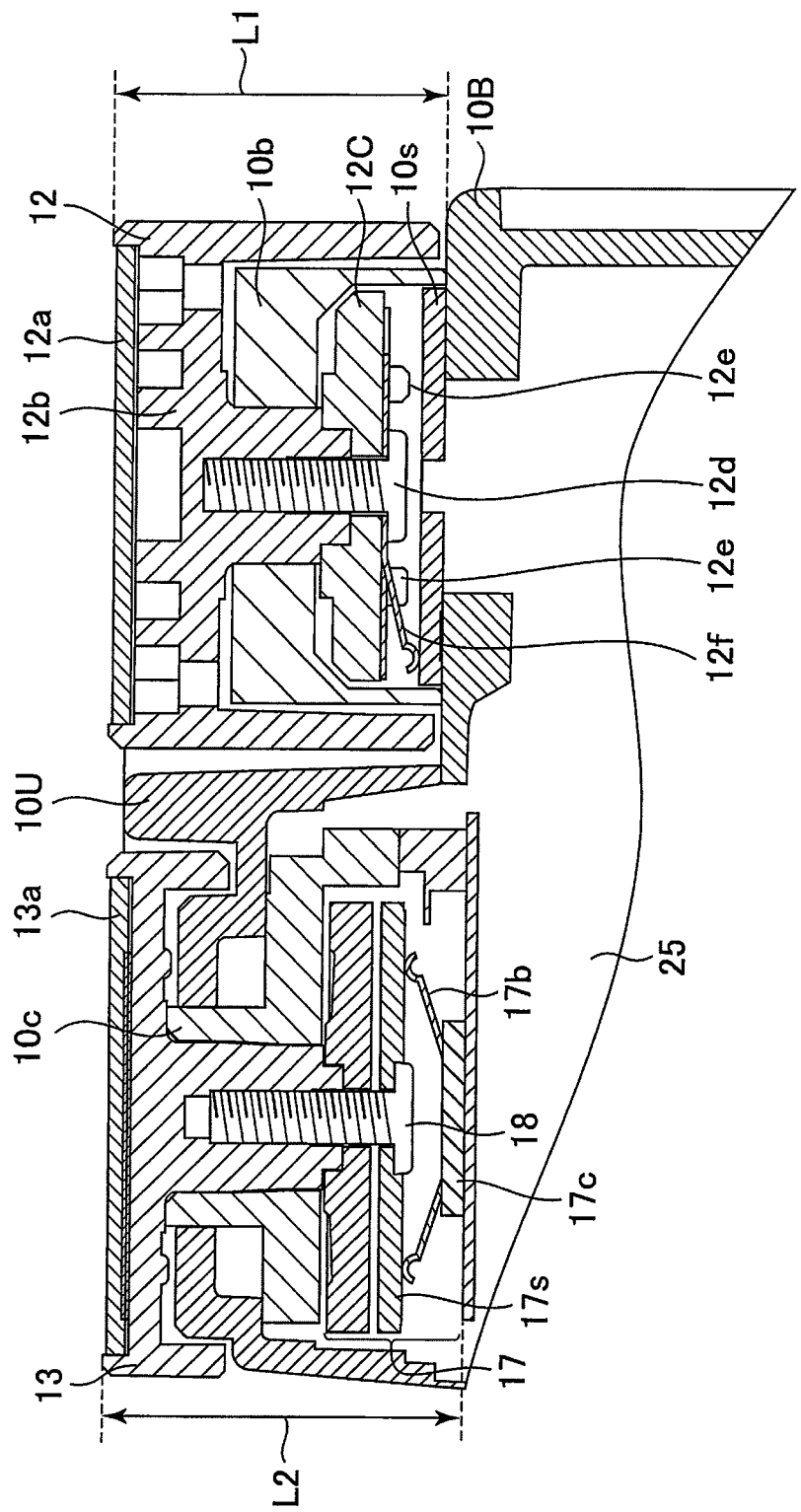
FIG. 5 is a partial cross sectional view on the right side of the digital camera according to the embodiment of the present invention.

A description will now be given of an embodiment of the present invention with reference to drawings. FIGS. 1 to 4 are a front view, a top view, a right side view, and a front perspective view of a digital camera according to the embodiment of the present invention. FIG. 5 is a partial cross sectional view on the right side of the digital camera according to the embodiment of the present invention.

The digital camera of this embodiment is an interchangeable-lens digital camera, for example, and a lens mount 11 for mounting a lens barrel is arranged at a front center of the camera main unit 10. A mode dial 12, an electronic dial 13, a release button 14, and the like are arranged on the left side of an upper surface 10U, and a built-in strobe unit 15 is arranged on a front surface on the right side of the camera main unit 10 in the front view and the top view. It should be noted that the respective figures are drawn in a state in which the lens barrel is dismounted, and an optical axis L when the lens barrel is mounted is represented by a long dashed short dashed line in FIGS. 1-3.

The mode dial 12 is used to select a desired mode out of multiple modes for shooting and the like, and rotates by an operation of a user so as to orthogonally intersect with a digital camera front surface 10F. A manual exposure mode denoted by M, a program AE mode denoted by P, a movie mode, an auto picture mode denoted by AUTO, and the like, for example, are marked on an upper surface 12U of the mode dial 12 (refer to FIG. 2). An indicator 12M is marked on the upper surface 10U of the camera main unit 10. A mark of a desired shooting mode is made coincident with the indicator 12M marked on the camera main unit 10 by rotating the mode dial 12. The user can select the desired mode by selecting a left or right rotation direction for operating the mode dial 12 in this way.

The electronic dial 13 is a dial for adjusting a parameter in response to the set shooting mode, and rotates in either of left and right rotational directions by an operation of the user so as to orthogonally intersect with a digital camera rear surface 10R. A click mechanism is provided for the electronic dial 13 so as to provide a click feeling during the dial operation, which is not illustrated.

If the release button 14 is depressed halfway, a photometry switch is turned on, and if the release button is depressed fully, a release switch is turned on.

Figure 1:
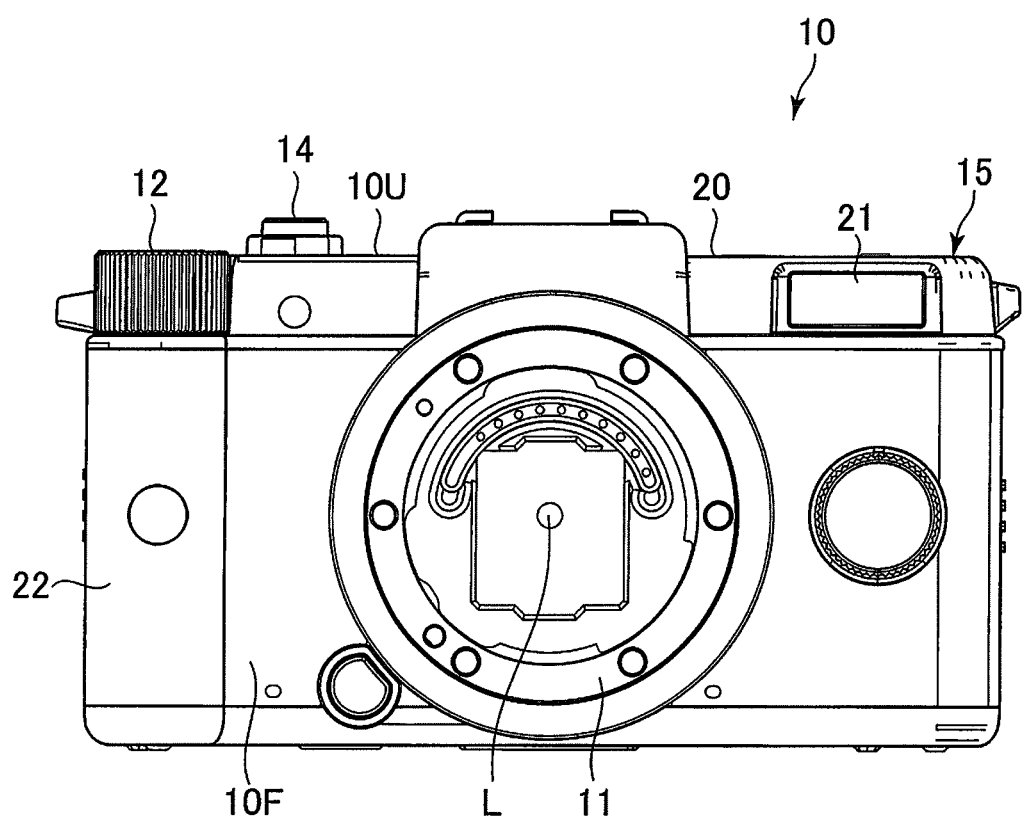
FIG. 1 is a front view of a digital camera according to an embodiment of the present invention.
Figure 2:
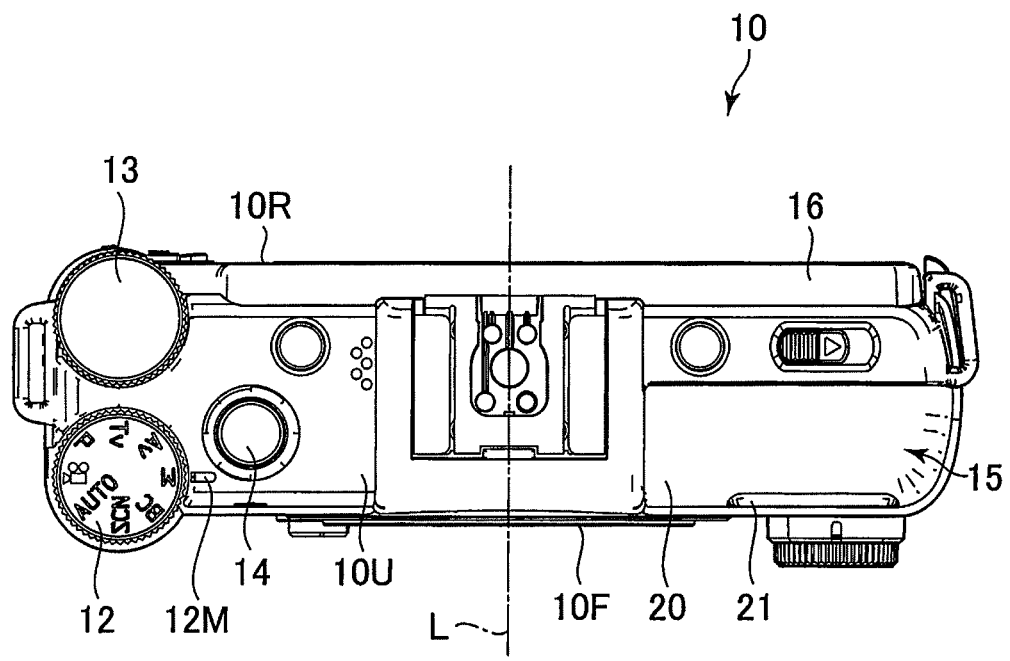
FIG. 2 is a top view of the digital camera according to the embodiment of the present invention.

The mode dial 12 and the electronic dial 13 are respectively in circular shapes, and are the same in diameter, the upper surfaces 12U and 13U thereof are arranged so as to approximately flush with the upper surface 10U of the camera main unit 10. The upper surfaces 12U and 13U may be uneven to the upper surface 10U of the camera main unit 10. The release button 14 is provided so that an upper surface 14U thereof protrudes from the upper surface 10U of the camera main unit 10. Moreover, the mode dial 12 and the electronic dial 13 are arranged so that the mode dial 12 on the front surface 10F side of the camera main unit 10, and the electronic dial 13 on the rear surface 10R side of the camera main unit 10 are in parallel with the optical axis L of the camera main unit 10 on an end port ion of the camera main unit 10 as shown in FIG. 2.

A pop-up knob 16 in a slider knob configuration for popping up the built-in strobe unit 15 is provided behind the built-in strobe unit 15 on the upper surface 10U on the left side (right side in FIGS. 1, 2, and 4) of the camera main unit 10. A light source (not shown) of the built-in strobe unit 15 is held by a strobe holding member (not shown), and is stored in a strobe cover 20. A window 21 for radiating strobe light is provided in front of the strobe cover 20. It should be noted that a storage portion (not shown) which stores a battery in a plate shape for the camera main unit 10 is provided at a lower portion on the rear surface 10R side on the left side of the camera main unit 10. It should be noted that the mode dial 12 and the window 21 are designed to have approximately the same thickness.

A grip portion 22 is formed on the front surface 10F side, and a card cover 23 is formed on the rear surface 10R side below the electronic dial 13 on the right side (left side in FIGS. 1, 2, and 4) of the camera main unit 10. The grip portion 22 is formed below the mode dial 12 in a semi-cylindrical shape concentric with the mode dial 12. Boards and wires for a light for a self-timer and the like (not shown) are arranged inside the grip portion 22.

The grip portion 22 is a member gripped by the middle finger, the ring finger, and the little finger when the camera main unit 10 is gripped by the right hand. The camera main unit 10 is held by these three fingers, particularly by the middle finger supporting the grip portion 22. On this occasion, the mode dial 12 is supported and operated by the index finger of the right hand. A grip of the camera main unit 10 is formed by the mode dial 12 and the grip portion 22 in this way.

Figure 3:
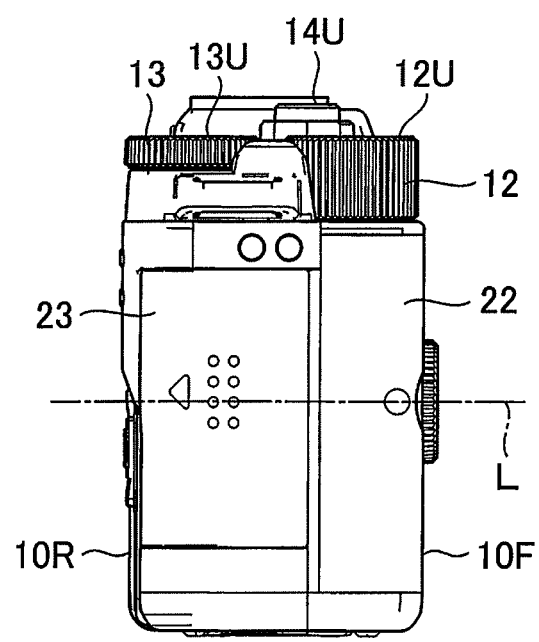
FIG. 3 is a right side view of the digital camera according to the embodiment of the present invention.
Figure 4:
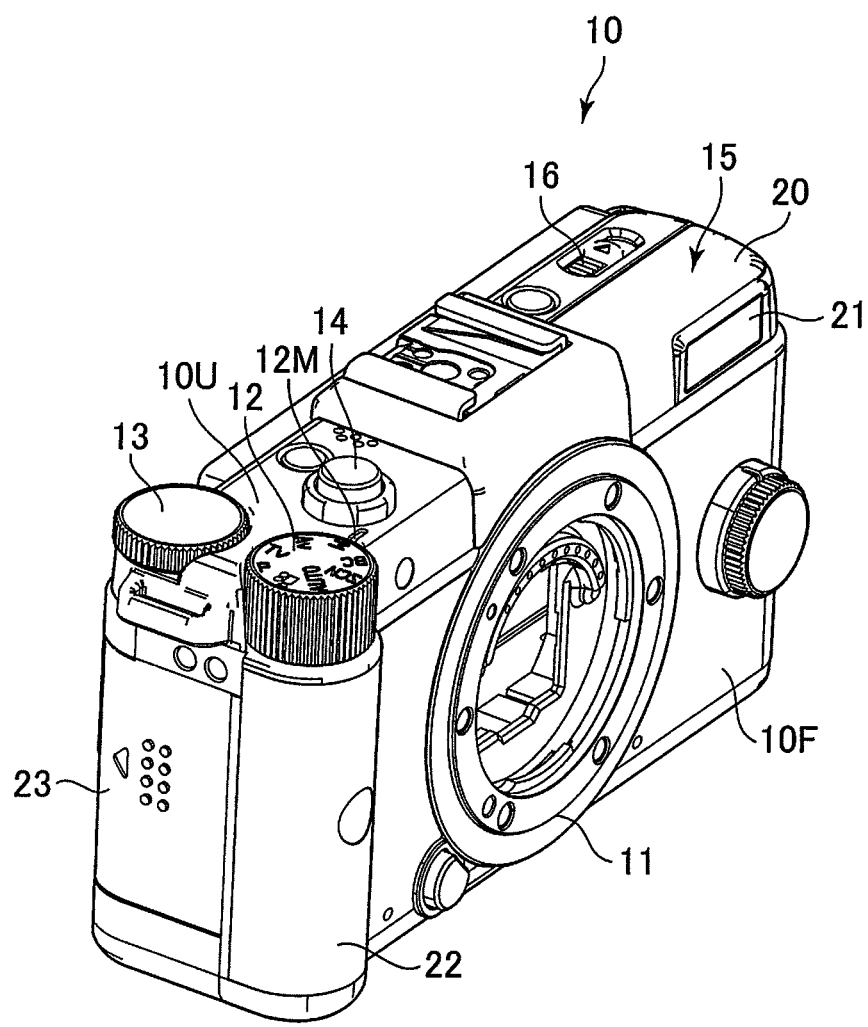
FIG. 4 is a perspective view of the digital camera according to the embodiment of the present invention.

The card cover 23 is a cover for a storage portion 25 (refer to FIG. 5) for storing a recording medium (not show) such as a memory card (SD card) to be inserted from the outside as shown in FIG. 3. An SD card slot (holding frame), which is not shown, is arranged by forming a recessed space in a box shape, for example, in the storage portion 25, and an SD card is inserted into the SD card slot from the outside. The card cover 23 is provided with a lock mechanism (not shown), and is locked by the lock mechanism for opening/closing with respect to the camera main unit 10 on the right side of the camera main unit 10. The camera main unit 10 is small according to this embodiment, and is configured so as to arrange only the recording media frame on the right side of the camera main unit 10, and the battery and the recording medium are independently stored on both sides of the camera main unit 10 in this way. It should be noted that the storage portion 25 may be configured so that a PC terminal and a DC terminal are provided. It should be noted that a tripod thread hole and a PC/AV terminal are provided on a camera bottom surface, which is not shown.

FIG. 5 is a partial cross sectional view of the right side of the camera main unit 10. The mode dial 12 is a dial for switching the shooting mode of the digital camera, and is held by a holding member 10b, which is a bearing for the mode dial 12, in order to prevent switching to an unintended position during the shooting. This holding member 10b is provided with a click mechanism constructed by a spring and a ball, which is not shown, and the mode dial 12 is set to rotate hard by increasing a spring force of the click mechanism. It is hard to rotate the mode dial 12 in this way, and the mode dial 12 can thus constitute a part of the grip when the camera main unit 10 is gripped. Moreover, even if the pad of the index finger touches the mode dial 12 when the release button 14 is depressed, the mode dial 12 is formed so thick that the mode dial 12 is hard to rotate. It should be noted that the mode dial 12 may be configured so that an independent friction member is provided.

A length from an upper end to a lower end of the mode dial 12 is L1, and the mode dial 12 is attached to a main unit portion 10B of the camera main unit 10. The mode dial 12 is attached by screwing a support member 12C provided with multiple terminals 12e and a base 12b to the main unit portion 10B of the camera main unit 10 using an attachment screw 12d, assembling and fixing the mode dial 12 thereto, and adhering a lettered dial 12a on which letters are arranged in the circumferential direction to an upper portion of the mode dial 12. As the mode dial 12 rotates, the support member 12C and a brush 12f provided on a lower portion thereof for switching the mode rotate, thereby coming in contact with a board 10s attached on the main unit portion 10B of the camera main unit 10, and setting the various shooting modes.

The electronic dial 13 is a dial for adjusting a parameter according to the set shooting mode, and is operated by the thumb of the right hand if the camera main unit 10 is gripped by the right hand according to this embodiment. The electronic dial 13 is fit into a support member 10c of a cover constituting the upper surface 10U of the camera main unit 10 from the front surface, and is screwed by an attachment screw 18 from a rear surface of the upper surface 10U of the camera main unit 10 while the encoder 17 is interposed. An upper disk 13a is adhered to an upper portion of the attached electronic dial 13. The encoder 17 is constructed by a board 17s, a brush 17b, and a support member 17c, for example. There are various types of the encoder 17, and any encoder publicly known can be used in this embodiment.

As the electronic dial 13 rotates, the encoder 17 is rotated, and the parameter is adjusted in each of the shooting modes according to this embodiment. The electronic dial 13 finely adjusts the parameter by the rotational operation, and is larger in operation quantity than the mode dial 12. Therefore, the electronic dial 13, compared with the mode dial 12, is set to small in rotational torque, namely a force applied when the dial 13 starts moving from a stationary state of the dial to a next position. Moreover, the electronic dial 13 is formed thinner than the mode dial 12. The electronic dial 13 tends to be pressed into the pad of the thumb during the operation by being formed thinner than the mode dial 12, becomes easy to rotate, and provides excellent operation feeling. It should be noted that the thickness of the electronic dial 13 is equal to or less than a half the thickness of the mode dial 12 in this embodiment (refer to FIGS. 3-5).

The length L1 from the upper end to the lower end of the mode dial 12 is set to approximately equal to a length L2 from an upper end of the electronic dial 13 to a lower end of the encoder 17 arranged below the electronic dial 13 according to this embodiment. The mode dial 12 is formed thicker than the electronic dial 13, and the upper surface 12U of the mode dial 12 and the upper surface 13U of the electronic dial 13 are arranged so as to flush with the upper surface 10U of the camera main unit 10, resulting in the space formed below the electronic dial 13 for storing the encoder 17. Moreover, the length L2 from the upper end of the electronic dial 13 to the lower end of the encoder 17 is set to approximately the same as the length L1 from the upper end to the lower end of the mode dial 12, thereby forming the space in the box shape below the encoder 17. This space is set to the storage portion 25 for the SD card inserted from the outside.

As described above, on the digital camera according to this embodiment, the upper surfaces of the electronic dial and the mode dial approximately flush with the upper surface of the camera main unit, the length from the upper end to the lower end of the mode dial is set to approximately the same as the length from upper end of the electronic dial to the lower end of the encoder arranged below the electronic dial, the thickness of the electronic dial is thus thinner than the thickness of the mode dial, the space for storing the encoder is formed therebelow, and the space in the box shape is also formed below the encoder. This space can be efficiently used by setting the space as the storage portion for the component to be inserted from the outside. The formation of the space in the box shape in the compact device while a useless space is reduced as much as possible in this way according to this embodiment is efficient in terms of design, and the reduction in size of the digital camera can thus be attained. Moreover, the space in the box shape may be formed between the electronic dial, mode dial, and base of the main camera unit. In this configuration, the length from the upper end to the lower end of the mode dial is approximately the same as the length from the upper end of the electronic dial to the lower end of the encoder arranged below the electronic dial.

Moreover, the mode dial is operated by the index finger of the right hand, and the electronic dial is operated by the thumb by arranging the mode dial and the electronic dial so that the optical axis and an axis connecting between the center of the mode dial and the center of the electronic dial are parallel with each other on the end on the right side of the camera main unit. Therefore, the operation can be easily carried out only by the right hand, thereby preventing the operability from degrading.

Further, by setting the smaller torque for the electronic dial larger in operation quantity than the mode dial, and by setting the mode dial thicker than the electronic dial, the mode dial is prevented from being excessively rotated, and from moving to an unintended position, and the size of the digital camera can be reduced without sacrificing the operability.

If the upper surface of the release button approximately flushed with the upper surfaces of the mode dial and the electronic dial, the operation by the index finger depressing the release button would become difficult. In contrast, the upper surface of the release button protrudes more than the upper surfaces of the mode dial and the electronic dial according to this embodiment, and the operation on the release button thus becomes easier.

Moreover, the mode dial and the electronic dial are equal in diameter, are thus easy to design, enable further reduction in size, and provide excellence in design of the camera. Moreover, the mode dial and the window for the strobe light are approximately the same in thickness, resulting in further reduction in size and increase in excellence of design of the camera.

Further, the size of the digital camera can be reduced without sacrificing the operability by constituting the grip by the grip portion and the mode dial, and by permitting the operation on the mode dial by the index finger of the right hand and permitting the operation of the electronic dial by the thumb while the camera main unit is gripped by the right hand according to this embodiment. Moreover, the arrangement of the mode dial and the electronic dial leaving the gap for avoiding a contact provides such effects that a foreign matter is prevented from entering between the dials, and a finger is prevented from been pinched if the dials meshes with each other as gears.

Though the electronic dial and the mode dial are arranged so that the mode dial is on the front surface of the camera main unit and the electronic dial is on the rear surface of the camera main unit, the electronic dial and the mode dial may be arranged so that the mode dial is on the rear surface side of the camera main unit and the electronic dial is on the front surface of the camera main unit with both dials aligned parallel to the optical axis of the camera main unit and positioned on an end portion of the camera main unit.

Though the mode dial and the electronic dial are arranged on the end on the right side of the camera main unit according to this embodiment, they may be provided on the end on the left side. Moreover, though the interchangeable-lens digital camera is exemplified in the description of this embodiment, this embodiment can be applied to any other types of camera, and is not limited to the example.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2011-128986 (filed on Jun. 9, 2011), which is expressly incorporated herein, by reference, in its entirety.

The invention claimed is:

1. A digital camera having an electronic dial and a mode dial on an upper portion of a camera main unit, said digital camera comprising:
   upper surfaces of the electronic dial and the mode dial being approximately flush with an upper surface of the camera main unit;
   the electronic dial and the mode dial being arranged so that a line joining an axis of the mode dial on the front surface side of the camera main unit, and an axis of the electronic dial on the rear surface side of the camera main unit is parallel with an optical axis of a lens of the camera main unit on the end portion of the camera main unit;
   a length from the upper end to the lower end of the mode dial, in a direction transverse to the upper surface of the camera main unit and transverse to the optical axis, being approximately a same as a length from the upper end of the electronic dial to the lower end of an encoder located below the electronic dial.

2. The digital camera according to claim 1, further comprising a grip at an end portion of the camera main unit, the mode dial defining part of the grip.

3. The digital camera according to claim 2, wherein the grip has a semi-cylindrical shape concentric with the axis of the mode dial.

4. The digital camera according to claim 1, wherein a storage portion provided by a substantially rectangular shaped space for storing at least one of a recording medium inserted from the outside, a PC terminal, and a DC terminal is provided-below the encoder.

5. The digital camera according to claim 1, wherein the electronic dial has a rotational torque smaller than a rotational torque of the mode dial.

6. The digital camera according to claim 1, further comprising a release button, an upper surface of the release button protruding from the upper surface of the camera main unit more than a protrusion of the upper surfaces of the electronic dial and the mode dial.

7. The digital camera according to claim 6, wherein the release button is arranged on the same side of the camera main body as the electronic dial and the mode dial.

8. The digital camera according to claim 1, wherein the electronic dial and the mode dial have a same diameter.

9. The digital camera according to claim 1, wherein an operation portion of the electronic dial is set to be thinner than an operation portion of the mode dial.

10. The digital camera according to claim 1, a thickness of an operational surface of the electronic dial is equal to or less than half a thickness of an operational surface of the mode dial, in the direction transverse to the upper surface of the camera main unit and transverse to the optical axis.

11. A digital camera having an electronic dial and a mode dial on an upper portion of a camera main unit, said digital camera comprising:
   upper surfaces of the electronic dial and the mode dial being approximately flush with an upper surface of the camera main unit;
   the electronic dial and the mode dial being arranged so that a line joining an axis of the mode dial on the rear surface side of the camera main unit, and an axis of the electronic dial on the front surface side of the camera main unit is parallel with an optical axis of a lens of the camera main unit on an end portion of the camera main unit;

a length from the upper end to the lower end of the mode dial, in a direction transverse to the upper surface of the camera main unit and transverse to the optical axis, being approximately the same as the length from the upper end of the electronic dial to the lower end of an encoder located below the electronic dial.

12. The digital camera according to claim 11, wherein movement of the electronic dial requires a rotational torque smaller than a rotational torque required for movement of the mode dial.

13. The digital camera according to claim 11, wherein an operational portion of the electronic dial is thinner, in the direction transverse to the upper surface of the camera main unit and transverse to the optical axis, then an operational portion of the mode dial.

14. They digital camera according to claim 11, a storage portion, configured as a substantially rectangular parallelepiped, is provided beneath the encoder and is configured to accommodate at least one of an insertable recording medium, a PC terminal and a DC terminal.

15. A digital camera having an electronic dial and a mode dial on an upper portion of a camera main unit, said digital camera comprising:

upper surfaces of the electronic dial and the mode dial being approximately flush with each other;

the electronic dial and the mode dial being arranged such that a line extending between an axis of the mode dial on the front surface or the rear surface of the camera main unit, and an axis of the electronic dial on the rear surface or the front surface of the camera main unit is parallel with the optical axis of a lens of the camera main unit, on the end portion of the camera main unit; and a generally rectangular parallelepiped shaped space is provided between the electronic dial and the mode dial, and a base of the camera main unit; and wherein a length from an upper end to a lower end of the mode dial, in a direction transverse to the upper surface of the camera main unit and transverse to the optical axis is approximately the same as a length from an upper end of the electronic dial to a lower end of an encoder arranged below the electronic dial.

16. The digital camera according to claim 15, the generally rectangular parallelepiped shaped space is configured to receive at least one of an externally insertable memory device, a PC terminal and a DC terminal.

17. The digital camera according to claim 16, further comprising a cover member configured to lockingly close the generally rectangular parallelepiped shaped space.

18. The digital camera according to claim 15, wherein a battery storage compartment is provided on an opposite side of the camera main unit, with respect to the optical axis, from the generally rectangular parallelepiped shaped space.

19. The digital camera according to claim 15, wherein the electronic dial and the mode dial have a same diameter.

* * * * *